US012621206B2

(12) United States Patent
Bush

(10) Patent No.: US 12,621,206 B2
(45) Date of Patent: May 5, 2026

(54) NETWORK CONFIGURATION USING COUPLED OSCILLATORS

(71) Applicant: Dolby Intellectual Property Licensing, LLC, Wilmington, DE (US)

(72) Inventor: Stephen F. Bush, Schenectady, NY (US)

(73) Assignee: Dolby Intellectual Property Licensing, LLC, Wilmington, DE (US)

( * ) Notice: Subject to any disclaimer, the term of this patent is extended or adjusted under 35 U.S.C. 154(b) by 19 days.

(21) Appl. No.: 18/722,109

(22) PCT Filed: Dec. 20, 2022

(86) PCT No.: PCT/US2022/082004
§ 371 (c)(1),
(2) Date: Jun. 20, 2024

(87) PCT Pub. No.: WO2023/122576
PCT Pub. Date: Jun. 29, 2023

(65) Prior Publication Data
US 2025/0158880 A1 May 15, 2025

Related U.S. Application Data

(60) Provisional application No. 63/292,228, filed on Dec. 21, 2021, provisional application No. 63/291,501, filed on Dec. 20, 2021.

(51) Int. Cl.
*H04L 41/0806* (2022.01)
*H04L 41/14* (2022.01)
(52) U.S. Cl.
CPC ........ *H04L 41/0806* (2013.01); *H04L 41/145* (2013.01)

(58) Field of Classification Search
CPC .......................... H04L 41/0806; H04L 41/145
(Continued)

(56) References Cited

U.S. PATENT DOCUMENTS

2009/0207894 A1* 8/2009 Nefedov .............. H04B 1/7183
375/219
2017/0104493 A1* 4/2017 Goto ...................... H10N 60/12
(Continued)

FOREIGN PATENT DOCUMENTS

GB           2 440 378 A        1/2008
WO     WO-2021072221 A1 *   4/2021     ............. G06Q 10/04
WO        2023122576 A1      6/2023

OTHER PUBLICATIONS

Search Report and Written Opinion issued in corresponding International Patent Application No. PCT/US2022/082004, dated Mar. 29, 2023, 11 pages.

*Primary Examiner* — Ruolei Zong
(74) *Attorney, Agent, or Firm* — Flaster Greenberg PC

(57) ABSTRACT

A system includes one or more processors and memory. The memory stores instructions for execution by the one or more processors, including instructions for: obtaining a configuration request for a communications network; configuring a network of models (e.g., oscillators or oscillators' settings) into an initial configuration representing the configuration request for the communications network; reading out a final configuration of the network of models, the final configuration representing a solution to the configuration request for the communications network; and providing information over the communications network according to the configuration request.

20 Claims, 9 Drawing Sheets

(58) Field of Classification Search
USPC ......................................................... 709/222
See application file for complete search history.

(56) References Cited

U.S. PATENT DOCUMENTS

| 2019/0349392 | A1 | 11/2019 | Wetterwald et al. | |
|---|---|---|---|---|
| 2020/0259896 | A1 | 8/2020 | Sachs et al. | |
| 2020/0412813 | A1 | 12/2020 | Mong et al. | |
| 2021/0243641 | A1 | 8/2021 | Gangakhedkar et al. | |
| 2022/0224590 | A1* | 7/2022 | Tiwari | G06N 5/01 |
| 2022/0389414 | A1* | 12/2022 | Aspuru-Guzik | G06N 99/007 |
| 2023/0077665 | A1* | 3/2023 | Kuttimalai | G06F 17/11 |
| | | | | 700/90 |

\* cited by examiner

600 ➘

Obtain a configuration request for a communications network. ⌐602

> The configuration request for the communications network is a scheduling request for a time-sensitive network (TSN). ⌐604

> The TSN is a self-organizing network (SON). ⌐606

> The communications network is a 5G network. ⌐608

↓

Configure a network of oscillators into an initial configuration representing the configuration request for the communications network. ⌐610

> Configure the network of the oscillators into the initial configuration representing the configuration request for the communications network comprises representing the configuration request as a quadratic unconstrained binary optimization (QUBO) task. ⌐612

> The oscillators are pulse-coupled oscillators. ⌐614

> The oscillators are distributed across a plurality of user equipment (UE) devices and information to configure the network of oscillators is sent over the communications network. ⌐616

↓

618

Read out a final configuration of the network of oscillators, the final configuration representing a solution to the configuration request for the communications network.

620

The operations of configuring the network of oscillators and reading out a final configuration of the network of oscillators are performed in under a second.

622

The operations of configuring the network of oscillators and reading out a final configuration of the network of oscillators are performed in under an amount of time required for data communications.

624

Provide information over the communications network according to the configuration request.

FIG. 6B

NETWORK CONFIGURATION USING COUPLED OSCILLATORS

CROSS REFERENCE TO RELATED APPLICATIONS

This application is a 371 National Entry of International Patent Application No. PCT/US2022/082004, filed Dec. 20, 2022, which claims the benefit of priority to U.S. Provisional Patent Application Ser. No. 63/291,501, filed Dec. 20, 2021 and U.S. Provisional Patent Application Ser. No. 63/292, 228, filed Dec. 21, 2021, which are incorporated herein by reference in their entirety.

TECHNICAL FIELD

The present disclosure relates generally to solving network configuration problems using a network of coupled oscillators (e.g., an Ising machine), such as configuring a schedule for a deterministic network (e.g., a time-sensitive network (TSN)) using a network of coupled oscillators, MIMO detection (e.g., in a 5G network) and precoding to minimize variance for TSN traffic.

BACKGROUND

Some applications such as industrial automation and manufacturing require ubiquitous and seamless connectivity with strict, deterministic timing requirements for communications between various devices or components (e.g., an industrial controller, a sensor, an actuator, etc.) of the application. To meet such requirements, a TSN system, which provides deterministic communication with relatively stringent quality of service (QOS) parameters, such as latency, jitter and reliability requirements for data traffic, may be integrated with a 5G wireless communication system, which provides a high reliability service, such as an ultra-reliable low latency communication (URLLC) service.

TSN scheduling (or more generally, scheduling within a deterministic network), however, is an NP computational problem, and thus conventional methods for calculating TSN schedules are time-consuming and resource intensive. These and other difficult optimization problems, such as MIMO detection (e.g., in a 5G network) and precoding to minimize variance for TSN traffic are addressed by the present disclosure.

BRIEF DESCRIPTION OF THE DRAWINGS

Certain features of the subject technology are set forth in the appended claims. However, for purpose of explanation, several aspects of the subject technology are set forth in the following figures.

FIGS. 6A-6B are flow diagrams illustrating a method of solving a network configuration request, in accordance with some embodiments.

DETAILED DESCRIPTION

Figure 1:
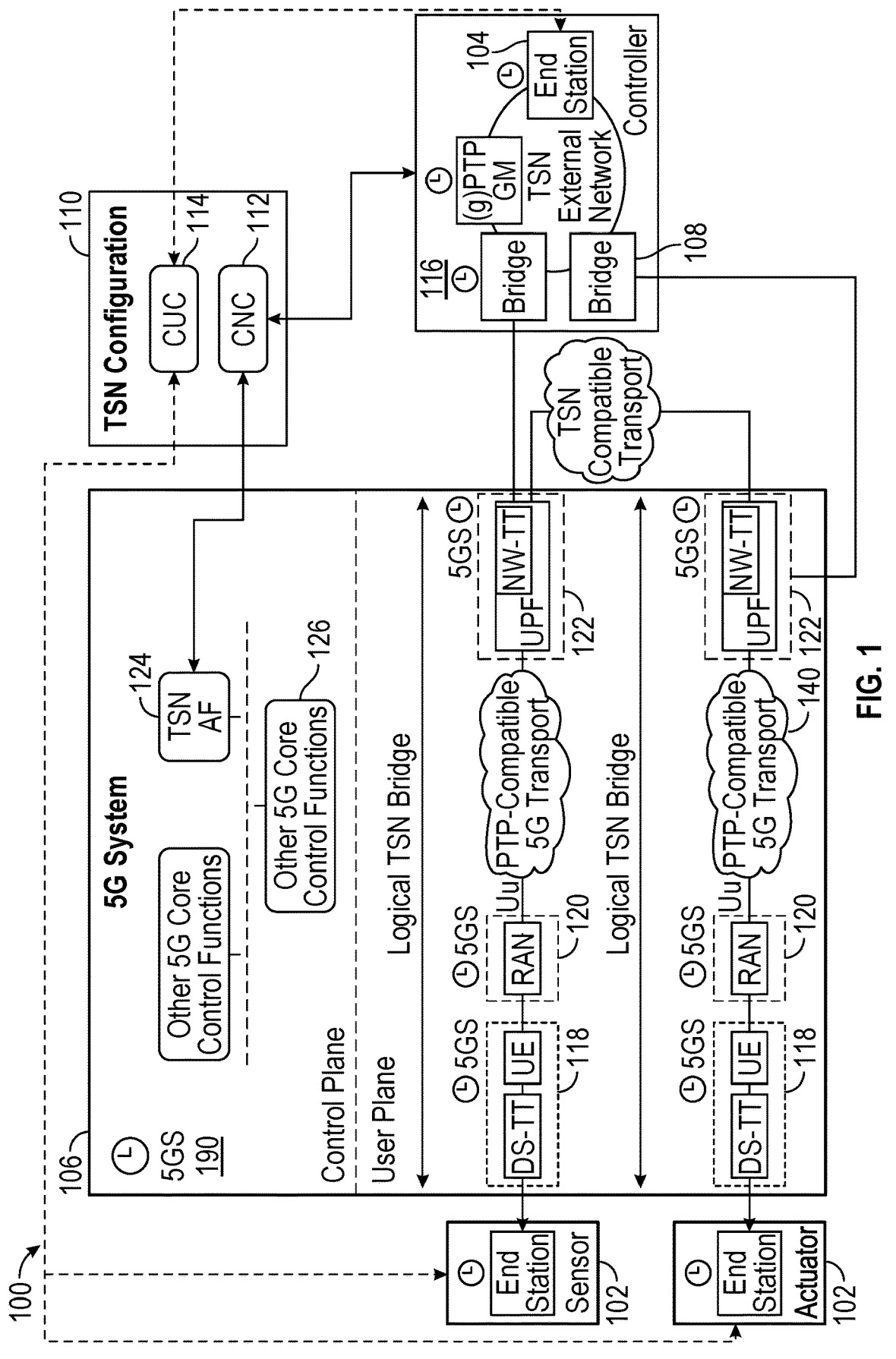
FIG. 1 illustrates an example of a conventional integrated TSN-5G system 100 in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, for some applications such as, but not limited to, industrial automation, manufacturing, and aerospace and automotive in-vehicle communications, a TSN system, which provides deterministic communication may be integrated with a fifth-generation (5G) wireless communication system, which provides flexibility and an ultra-reliable low latency communication (URLLC) service. TSN scheduling, however, is an NP computational problem, and thus conventional methods for calculating TSN schedules are time-consuming and resource intensive.

These problems are reduced or mitigated by representing a TSN scheduling problem (or other network configuration problem) through a network of coupled oscillators (e.g., an Ising machine). In accordance with some embodiments, a TSN scheduling request includes a network topology, information about sources (talkers) and destinations (listeners), and maximum allowable latencies. The TSN scheduling request is converted into a minimization problem (or, equivalently, a maximization problem) that is solved by a network of oscillators. For example, in some embodiments, a TSN scheduling request is converted into a quantum program task, e.g., in a quadratic unconstrained binary optimization (QUBO) format. QUBO is an approach to solving a set of minimization problems that is frequently discussed in the context of quantum computers, but the present disclosure applies a QUBO approach to coupled classical oscillators (e.g., micro-electromechanical system oscillators, RC-circuits, etc.) to solve network configuration problems. (It should be noted, however, that, in some embodiments, the network configuration approaches described herein may be implemented using quantum computers rather than classical oscillators.) In the QUBO format, constraints set forth in the TSN scheduling request are converted to equality constraints defined with respect to a set of binary variables. A final (e.g., equilibrium) state of the oscillators is read out, and converted back to a TSN scheduling format (e.g., a set of TSN flows), which defines the states of switches in the TSN at various times (e.g., defines the state, open or closed, of each port in each switch at each time during a communications cycle).

In accordance with some embodiments, the oscillators are distributed across a plurality of spatially separated devices. For example, in some embodiments, the TSN network is a TSN-5G network, and the oscillators are distributed across user equipment (UE) devices. In various embodiments, the oscillators may also be distributed across radio access network (RAN), core network (CN), and/or other components of a 5G system (e.g., as described with respect to FIG. 1, below). In some embodiments, the oscillators are distributed across UE devices (gNB), RAN devices, and optionally other components of a 5G system. Information needed to couple the oscillators between distributed devices is passed over the 5G network itself (e.g., over a 5G management network). For example, the coupling between different devices can be done digitally, by representing the oscillator frequency as a message or by direct transmission of an RF signal. In some embodiments, a scheduler (e.g., 5G schedule) is optimized to send messages at specific frequencies to form the coupling (e.g., the network uses the standard 5G frequency variation as the coupling between oscillators on different devices). In some embodiments, the oscillators include local oscillators that are required on 5G devices.

Using this approach, as well as other approaches and modifications described herein, the TSN scheduling can be implemented as a self-organizing network (SON) (e.g., a TSN can self-heal via rapidly rescheduling) as defined in https://www.etsi.org/deliver/etsi_ts/128300_128399/128313/16.00.00_60/ts_128313v160000p.p df, which is incorporated herein by reference in its entirety. Moreover, the TSN computation time for certain TSN networks can be reduced from roughly 5 minutes to less than a second. More particularly, in some circumstances, these approaches have the ability to reschedule a TSN sufficiently fast as to not cause delay in any scheduled messages (e.g., the rescheduling is done sufficiently fast such that all messages arrive on time per the constraints set forth in the TSN scheduling request without loss or misrouted messages). This is especially important in circumstances in which a component of the TSN fails (e.g., a talker, listener, or switch), and thus the TSN needs to be reconfigured in order to continue to operate. The talker or listener may be polymorphic, that is, able to change its form, migrate to a new platform, or reconstitute itself on a new platform. This could include 5G multi-access edge computing (MEC). Thus, the present disclosure provides rapid rescheduling of a TSN that allows for seamless switchover from one TSN schedule to another. However, it should be noted that the TSN scheduling described in this disclosure as an example implementation of a SON, and there may be other implementations and applications directed to determining various network configurations based on a SON in accordance with the techniques provided in this disclosure.

It should be noted that, although the use of coupled oscillators to solve TSN scheduling problems is described in detail below, analogous approaches using coupled oscillators are used, in accordance with some embodiments, to solve any of a number of other network configuration problems, including but not limited to other deterministic network scheduling problems, multiple-input, multiple-output (MIMO) detection, MIMO antenna beamforming subchannel weighting, singular value decomposition (SVD) and maximum likelihood estimate (MLE)-MIMO detection. This includes MIMO algorithms designed to minimize message variance, required for TSN streams.

Moreover, in some embodiments, an alternative approach to configuring the network of oscillators (other than QUBO) is used (e.g., an Ising model or a MAXCUT approach).

As used herein, the term TSN flow refers to time-critical or time-sensitive deterministic communications between end devices. Each TSN flow has strict time requirements that the networking devices must honor. Each TSN flow is uniquely identified by the network devices.

As used herein, the term "end devices" (also called talkers and listeners) refers to devices that act as sources and destinations of the TSN flows. The end devices run an application that requires deterministic communications. Note that, in some circumstances, the end device refers to an electronic device that a talker or listener resides upon, whereas the term talker/listener refers to a software application executing on an end-device. Unless otherwise noted, the terms are used synonymously in this disclosure.

Some of the bridges (also referred to as switches) described herein are capable of transmitting communications (e.g., Ethernet frames) of a TSN flow on a schedule, and are capable of receiving communications in a TSN flow on a schedule.

Without limitation, in a TSN, a central network configurator (CNC) acts as a proxy for the network (e.g., the TSN bridges and their interconnections) and the applications that require deterministic communication. In some embodiments, the CNC determines the TSN schedule (e.g., by providing information to spatially distributed devices that host oscillators, receiving back information concerning a final state of the oscillators, and converting the received information into a TSN schedule solution). The CNC performs TSN scheduling and can also be distributed, in which case the CNC is a distributed network configurator (DNC). It should be understood, however, that although the present disclosure refers to CNCs throughout, such CNCs may be distributed and, for example, reside on 5G MEC platforms.

Without limitation, in a TSN, a centralized user configurator (CUC) is an application that communicates with the CNC and end devices. In some embodiments, the CUC represents the applications that require deterministic communications and the end devices. In some embodiments the CUC makes requests to the CNC for TSN scheduling solutions based on the requirements of the applications and end devices. The CUC is user-defined and communicates with the user TSN applications to determine their deterministic requirements, such as maximum permissible latency, maximum message size, and maximum jitter requirements.

TSN Workflow

A TSN workflow typically involves the following steps, some of which may be omitted or combined based on the particulars of the application. In some circumstances, a TSN workflow may include additional steps not described below. Further, in some circumstances, operations performed by one component of a TSN (e.g., a CNC) may be performed by a different component of the TSN.

First, a CUC initiates a physical topology discovery. Before the TSN schedule can be computed, the TSN network topology must be specified. In some embodiments, the CUC initiates a request to the CNC to discover the physical topology. Using the link layer discovery protocol (LLDP) and a seed device, the CNC walks the physical topology, discovering each device and how they are connected. This includes the end devices that support LLDP. After completion, the CUC issues a request of the CNC to return the topology.

Second, the communications requirements are specified. This includes a determination of requested TSN flows (e.g., which talkers have to communicate with which listeners), the latency requirements for communication, the maximum size of the communication that will be sent, and any other requirements (e.g., whether there is a sequence order to the requested TSN flows).

Third, the CNC determines a TSN schedule. Determination of a TSN schedule is described in detail below. As a very simple example, consider a single talker communicating with a single listener via a single switch. Each link requires 2 µs propagation delay, messages take 100 us to transmit, and the maximum allowed delay is 1 ms. Then the TSN scheduler can choose a cycle time of 1 ms (which repeats every 1 ms) and schedule the switch's TSN gate to open (allowing transmission) every 1 ms-2*2 µs for 100 µs. A slightly more complex example would be to add another talker sending the messages through the same switch to the same listener. In this case the second talker will have a separate TSN flow. The second switch's output from the switch's TSN gate will have to use a different time slot to avoid colliding with the original TSN flow. The new flow could be assigned (0.5 ms-2*2 µs). In other words, there is a 1 ms cycle time and the TSN gate opens at the beginning of every cycle for the first flow, and the middle of every cycle for the second flow. As more TSN flows share the same TSN gate, they must be "squeezed" into non-overlapping times within the cycle. The problem grows dramatically in complexity as the number of talkers, listeners, and switches increases.

Fourth, the schedule is distributed to the TSN bridges, and optionally the end devices. The talkers, for example, transmit the TSN flows according to the schedule.

Conversion of TSN Scheduling Problems into a QUBO Formulation

In some embodiments, a TSN scheduling problem is formulated and converted into a Quadratic Unconstrained Binary Optimization (QUBO) problem (frequently discussed in the context of quantum annealing). In some embodiments, a TSN scheduling problem is formulated and converted into a different (e.g., closely related) type of optimization problem, such as an Ising model or MAXCUT problem.

Putting aside TSN scheduling for the moment, a QUBO problem is formulated as follows:

$$\min y = x^t C x$$

Here, x is a vector of binary variables, C is a symmetric matrix. The diagonal of C contains linear terms because $$x_j^2 = x_j.$$

Off-diagonal positions in C are quadratic terms.

Equality constraints can be added in the following form:

$$Ax = b$$

The equalities can be changed to inequalities by adding slack binary variables, s. Suppose the following inequality constraint must be added:

$$4x_1 + 5x_2 - x_3 \le 6$$

Then it can be converted to an equality:

$$4x_1 + 5x_2 - x_3 + s = 6$$

In this example, given the above equation and x is binary, we know that s must be less than or equal to seven and s can be represented as a binary expression: $s_1+2^1s_2+2^2s_3$. This allows us to bound the size of s. The following operation is a step toward bringing the equality constraints back to a QUBO format:

$$y=x^tCx+P(Ax-b)^t(Ax-b)$$

Here P is a positive scalar penalty for the inequality constraints. This can be simplified:

$$=x^tCx+x^tDx+c$$

Here D and c result from the inequality matrix multiplication. This can be further simplified to:

$$=x^tQx+c$$

The constant c can be dropped since the value above is minimized when $x^tQx$ is minimized regardless of the value of c.

Mapping the TSN Scheduling Problem to QUBO

The TSN scheduling problem is formulated as a set of inequalities. In this case, the variable is a set of values representing time (e.g., nanoseconds), converted into binary form (e.g., the variable x, described above, in this context is a vector of binary values representing the bits of a feasible time at which specific port gates open to transmit a message (e.g., an Ethernet frame) leaving a specific switch). In some embodiments, the minimum variable is always zero and the maximum will be the longest acceptable end-to-end latency. The largest value may also be the TSN Qbv cycle time, which is the least common multiple (LCM) of all the maximum acceptable end-to-end latencies. The range of values the variables may hold impacts the number of oscillators required. For example, if each variable must represent any integer nanosecond value less than a second, then there must be at least 30 oscillators in such a binary expansion. In some circumstances, the number of oscillators can be reduced. For the following example, only 26 qubits are required to represent 0<=x<=50,000,000 ns. The smaller the largest maximum allowable end-to-end latency, the fewer the number of oscillators required, although, in general, this also implies a smaller solution space and more difficult problem to solve.

Refer to the previously stated QUBO equation with inequalities to be minimized: $y=x^tCx+P(Ax-b)^t(Ax-b)$. The term with matrix C is unnecessary for the TSN scheduling formulation, leaving only the inequalities to be specified in matrix A and vector b. Consider a simple example schedule input in the context of TSN for avionics, comprised of only one TSN flow in a GE Aviation network topology. The following code snippet is a Satisfiability Modulo Theories (SMT) representation of an example problem to be converted to QUBO:

```
(set-option :produce-models true)
(set-logic QF_IDL)
(declare-fun t35_153_1_1 ( ) Int)
(declare-fun t88_89_1_1 ( ) Int)
(declare-fun t89_38_1_1 ( ) Int)
(declare-fun t94_88_1_1 ( ) Int)
(declare-fun t138_139_1_1 ( ) Int)
(declare-fun t139_94_1_1 ( ) Int)
(declare-fun t153_138_1_1 ( ) Int)
```

-continued

```
(assert (>= t35_153_1_1 0))
(assert (>= t88_89_1_1 (+ t94_88_1_1 2190)))
(assert (>= t89_38_1_1 (+ t88_89_1_1 2190)))
(assert (<= (+ t89_38_1_1 6442) (+ 0 50000000)))
(assert (>= t94_88_1_1 (+ t139_94_1_1 6442)))
(assert (>= t138_139_1_1 (+ t153_138_1_1 2190)))
(assert (>= t139_94_1_1 (+ t138_139_1_1 2190)))
(assert (>= t153_138_1_1 (+ t35_153_1_1 6442)))
(check-sat)
(get-value (t35_153_1_1))
(get-value (t88_89_1_1))
(get-value (t89_38_1_1))
(get-value (t94_88_1_1))
(get-value (t138_139_1_1))
(get-value (t139_94_1_1))
(get-value (t153_138_1_1))
```

The variable names encode information about the variable, namely the variables follow the format t_S_D_F_R, where S is the source node identifier for a one-hop link, D is the destination node identifier, F is the flow identifier, and R is used for reliability purposes, but not relevant in these examples.

Piecing together the assertions in this example, one can see that there is a single flow following the path: $35 \to 153 \to 138 \to 139 \to 94 \to 88 \to 89 \to 38$, which must be completed in $\leq 50,000,000$ ns or 50 ms.

Some items to be considered are as follows:

In some embodiments, a typical schedule has both less-than and greater-than inequalities, which can be solved by adding either positive or negative slack variables.

In some embodiments, the vector b is comprised of the scalar values in the assert statements.

In some embodiments, the matrix A is comprised of all variables as binary expansions.

In some embodiments, each t_S_D_F_R variable now becomes a binary expansion of the form t_S_D_F_R_j where j ranges from zero to the largest value required minus one, in this case 25, with understanding that the value is $2^j$t_S_D_F_R_j.

In some embodiments, the maximum value of j is j=ceil (log 2(max(variable)-min (variable)))−1. In this example j=26.

In some embodiments, the number of variables in the classical scheduling problem is V. In this example V=7.

In some embodiments, the number of slack variables is the number of inequalities E. In this example E=8.

In some embodiments, the dimensions of matrix A are E×J*(V+E), the number variables by the number of inequalities. In this example A is of size 8×390=3,120 elements.

In some embodiments, statements of the following form can be converted as follows:

(assert (>=t35_153_1_1 0))
  t35_153_1_1_j-s_j==0
(assert (>=t88_89_1_1 (+t94_88_1_1 2,190)))
  t88_89_1_1_j . . . t94_88_1_1+j-s_j==2,190
(assert (<=(+t89_38_1_1_6,442) (+0 50,000,000)))
  t89_38_1_1_j+6,442+s+j<=50,000,000
  t89_38_1_1_j+s+j<=50,000,000-6442
  t89_38_1_1_j+s+j<=49,993,558

In some embodiments, considering the operation y=P (Ax−b)$^r$(Ax−b), matrix A gains another column to become of size 9×390 and when multiplied by its transpose the resulting matrix will be of size 390×390 yielding x$^r$Qx+c. An estimate of the final dimensions of Q is thus [j*(V+E)]^2.

In some embodiments matrix Q is the final and only result required for the QUBO formulation of the problem.

In some embodiments, the size of the constraints may be reduced if a lower quality schedule result would be acceptable. For example, in various embodiments:

The variable size J could be reduced by searching over a smaller dynamic range, thus, specifying either a maximum size or dynamic range. The range does not have to be near zero but could be shifted anywhere a solution might be found.

The range of slack variables S could be reduced if an estimated bound on slack variables, is max(s)<<max (x).

The number of inequalities E could be reduced if immediate forwarding times (e.g. cut-through) are not required at each intermediate node.

Slack variables could be eliminated if exact end-to-end arrival times are required.

Indicating whether immediate forwarding times (e.g., cut-through) are not required at each intermediate node.

Indicating time resolution (microsecond, nanosecond, picosecond, etc.)

In addition, in some embodiments, as described herein, scalability is increased by solving multiple smaller Q matrices separately in a distributed or hierarchical manner.

A more complex scheduling example would show relationships among multiple overlapping flows, such as:

(assert (or (>=t1_2_10_1 (+t1_2_14_10)) (>=t1_2_14_1 (+t1_2_10_10)))).

OR assertions of this form describe two TSN flows intersecting, i.e., transmitting from the same port, where either one flow or the other must go first, but not both simultaneously. Specifically, this example asserts that flow identifier 10 from node 1 to 2 overlaps with flow identifier 14 from node 1 to node 2. In this case transmission is instantaneous, having a latency of zero, meaning that transmission rate is infinite (and latency is zero or essentially non-existent). More generally, latency will be non-zero.

Reducing Precision

Rather than requiring nanosecond precision, microsecond precision may be acceptable for many applications. Quantization error will result in less efficient use of network capacity but may be necessary to reduce the number of oscillators required. If instead of zero, we allow the minimum variable to be a microsecond or 1,000 ns, then j changes from 26 to 16 (ceil (log 2(50,000-0))). This results in:

$$V = 6,700$$
$$E = 355,330$$
$$j = 16$$
$$Q = 5,792,480 \wedge 2 = 3.3553e + 13 = 33,553,000,000,000$$

We can see that reducing the dynamic range does not have a dramatic enough effect. The number of variables and inequalities must be reduced. Flows that have no spatial overlap can be computed separately.

Pulse-Coupled Oscillators for MLE-MIMO

In some circumstances, a maximum-likelihood estimate (MLE)-MIMO problem specifies:

For pre-coding and decoding, problem size is defined as the number of users multiplied by the number of bits in the modulation scheme (constellation), For channel estimation, problem size is defined as the number of antennas multiplied by the number of users, multiplied by the number of bits for target resolution.

Here, we assume x is the number of bits in the modulation scheme, there is a given number of antennae per user, a given number of antennae at the receiver and y is the received signal approximated by Hx+n, where n is the noise with some unknown statistical characterization and H is the channel information matrix.

The maximum likelihood MIMO detection problem with identically independently distributed Gaussian noise at the receiver antennas reduces to:

$$\sim x(y) = \text{argmin\_x}|y - Hx|^{\wedge}2.$$

Namely, the value over all possible x that minimizes the magnitude of the difference (error) between the received signal and the signal composed from the channel information matrix is the best estimate of the actual signal. Note that this makes a critical assumption about the type and characterization of noise, which may not be independently and identically distributed (IID) Gaussian or not even stationary, in the real world.

We note that "channel hardening" makes the problem more challenging. This occurs as the number of base station antennas increases in a massive MIMO system and the channel variation correspondingly decreases. More generally, as the number of antennae in the system increases, variations in channel gain decrease in both the time and frequency domain. Thus, variations in channel gain in time and frequency decrease making finding the minimum in the above equation more difficult and the benefit of the additional antennae becomes negligible.

MLE can viewed as the application of a minimization problem. From an algorithmic perspective, there are numerous ways to iteratively decompose and solve an MLE problem including, but not limited to, Gradient descent, Newton-Raphson, Quasi-Newton, use of LaGrange Multipliers, and many others including Particle Swarm Optimization. Each approach has advantages and disadvantages in terms of partitioning the problem and impact on performance. A more comprehensive list of algorithms specific to the MIMO detection problem is included in the Appendix.

Interpreting of the performance of a MIMO system can vary depending upon the communication system key performance indicators, which can be focused upon a variety of goals including: (a) maximizing availability, (b) minimizing error rate, (c) maximizing spatial reuse, (d) maximizing overall capacity, and (e) minimizing variance in latency over time (for a time-sensitive (TSN) MIMO system), among many other key performance indicators. In other words, minimizing bit error rate, while important for some MIMO streams, may not be the only criteria for real systems.

A further complication is that, in the real world, there is little or even no statistical knowledge or characterization of the noise, which in many cases is non-Gaussian, impulsive, and not analyzable. Detection methods have primarily focused on specific noise models that are not robust with unknown noise statistics. In most of the literature, noise is assumed to be additive white Gaussian noise (AWGN), whose probability density function is analytical and the associated likelihood of each possible signal vector is unrealistically tractable.

As a benchmark metric for MLE-MIMO detection, one can measure the time required to achieve a particular bit error rate. This is simply the number of bits that differ between the transmitted symbol and the symbol estimated by the MLE-MIMO detection algorithm under test. But in reality, some bit errors can be detected and corrected while others cannot, depending upon the error detection and correction coding employed by the communication system. Ensuring the system is tested with realistic encoding and forward correction can also be crucial. Thus, domain expertise is required to determine a benchmark that offers true value.

In accordance with some embodiments, QUBO and Ising model encodings of the MLE problem (in general) and the MLE-MIMO detection problem (in particular) are implemented.

Various embodiments are now discussed with respect to the figures.

FIG. 1 illustrates a non-limiting example of an integrated TSN-5G system 100 in a 5G system 106. Overall, the system 100 is configured as a deterministic TSN system to communicate data between end-devices, e.g., input/output (I/O) devices 102 and a controller 104, via the 5G system 106 (emulating as a TSN bridge) and one or more (conventional) TSN bridges 108 and using a TSN controller 110. In some embodiments, the system 100 is configured using a network of oscillators, described in further detail below, allowing deterministic communication over standard Ethernet networks between end-devices, e.g., the I/O devices 102 and the controller 104. For example, the system 100 may operate in accordance with the IEEE 802.1Q TSN specification suite, which standardizes layer-2 communication for networking protocols providing deterministic communication while sharing the same infrastructure. For example, a number of standards establish various technological paradigms for a TSN system-clock synchronization (802.1AS, generalized Precision Time Protocol (gPTP)), frame preemption (802.3br and 802.1Qbu), scheduled traffic (802.1Qbv), and redundancy management (Frame Replication and Elimination for Reliability (FRER) IEEE 802.1CB). These standards must work together at the Ethernet layer-2 to ensure that critical control and safety functions are executed while meeting their respective deadlines and constraints.

For example, the 802.1Qbv TSN standard provides scheduled transmissions for safety-critical data frames in a predetermined manner, and is incorporated herein in its entirety. As used herein, "TSN schema" can refer, without limitation, to networks, components, elements, units, nodes, hubs, switches, controls, modules, pathways, data, data frames, traffic, protocols, operations, transmissions, and combinations thereof, that adhere to, are configured for, or are compliant with, one or more of IEEE 802.1 TSN standards. The 802.1Qbv TSN standard addresses the transmission of critical and non-critical data traffic within a TSN. Critical data traffic is guaranteed for delivery at a scheduled time while non-critical data traffic is usually given lower priority. Various traffic classes have been established according to IEEE 802.1Q that are used to prioritize different types of data traffic.

To achieve desired levels of reliability, TSNs employ time synchronization, and time-aware data traffic shaping. The data traffic shaping uses the schedule to control gating of transmissions on the network switches and bridges (e.g., nodes). In some aspects, the schedules for such data traffic in TSNs can be determined prior to operation of the network. In other aspects, the schedules for data traffic can be determined during an initial design phase based on system requirements, and updated as desired. For example, in addition to defining a TSN topology (including communication paths, bandwidth reservations, and various other parameters), a networkwide synchronized time for data transmission can be predefined. Such a plan for data transmission on communication paths of the network is typically referred to as a "communication schedule" or simply "schedule." The schedule for data traffic on a TSN can be determined for a specific data packet over a specific path, at a specific time, for a specific duration.

Time-critical communication between end devices or nodes (e.g., the I/O devices 102 and the controller 104) in TSNs includes "TSN flows" also known as "data flows" or simply, "flows." For example, data flows can comprise datagrams, such as data packets or data frames. Each data flow is unidirectional, going from a first originating or source end device (e.g., the I/O device 102) to a second destination end device (e.g., the controller 104) in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a set of data flows between the inter-connected devices or nodes can be defined. For example, the set of data flows can be between the interconnected devices. For the set of data flows, various subsets or permutations of the dataflows can additionally be defined. Further, time-critical communication between end devices or nodes in TSNs includes "TSN streams" or "streams," where each TSN stream may originate at a specific talker node intended to be communicated to one or more listener nodes. As such, each TSN stream may include one or more data flows, where each data flow is between the talker node (where the TSN stream originated) and a listener node.

Both end devices (e.g., 102, 104) and switches (commonly called "bridges" or "switching nodes") (e.g., 106, 108) transmit and receive the data (in one non-limiting example, Ethernet frames) in a data flow based on a predetermined time schedule. The switching nodes and end devices must be time-synchronized to ensure the predetermined time schedule for the data flow is followed correctly throughout the network. For example, in FIG. 1, the clocks 116 represent that the various switching nodes and end devices in the TSN system 100 (including in the 5G system 106) are to be time-synchronized with reference to a global clock (grandmaster clock timing). In some other aspects, only the switches can transmit the data based on the predetermined schedule, while the end devices, for example legacy devices, can transmit data in an unscheduled manner.

The data flows within a TSN can be scheduled using a single device (e.g., the controller 110) that assumes fixed, non-changing paths through the network between the talker/listener devices and switching nodes in the network. Alternatively, the data flows can be scheduled using a set of devices or modules. The scheduling devices, whether a single device or a set of devices, can be arranged to define a centralized scheduler. In still other aspects, the scheduler devices can comprise a distributed arrangement. The TSN can also receive non-time sensitive communications, such as rate-constrained communications. In one non-limiting example, the scheduling devices can include an offline scheduling system or module.

In some implementations, the I/O end device 102 may be, in various aspects, a complex mechanical entity such as the production line of a factory, a gas-fired electrical generating plant, avionics data bus on an aircraft, a jet engine on an aircraft amongst a fleet (e.g., two or more aircraft), a digital backbone in an aircraft, an avionics system, mission or flight network, a wind farm, a locomotive, etc. In various implementations, the I/O end device 102 may include any number of end devices, such as sensors, actuators, motors, and software applications. The sensors may include any conventional sensor or transducer, such as a camera that generates video or image data, an x-ray detector, an acoustic pick-up device, a tachometer, a global positioning system receiver, a wireless device that transmits a wireless signal and detects reflections of the wireless signal in order to generate image data, or another device.

Further, the actuators (e.g., devices, equipment, or machinery that move to perform one or more operations of the I/O device 102) can communicate using the TSN system 100. Non-limiting examples of the actuators may include brakes, throttles, robotic devices, medical imaging devices, lights, turbines, etc. The actuators can communicate status data of the actuators to one or more other devices (e.g., other I/O devices 102, the controller 104 via the TSN system 100). The status data may represent a position, state, health, or the like, of the actuator sending the status data. The actuators may receive command data from one or more other devices (e.g., other I/O devices 102, the controller 104) of the TSN system 100. The command data may represent instructions that direct the actuators how or when to move, operate, etc.

In some implementations, the controller 104 can communicate a variety of data between or among the I/O end devices 102 via the TSN 100. For example, the control system 104 can communicate the command data to one or more of the devices 102 or receive data, such as status data or sensor data, from one or more of the devices 102. Accordingly, the controller 104 may be configured to control operations of the I/O devices 102 based on data obtained or generated by, or communicated among the I/O devices 102 to allow for, e.g., automated control of the I/O devices 102 and provide information to operators or users of the I/O devices 102. The controller 104 may define or determine the data flows and data flow characteristics in the TSN system 100.

Referring now to the 5G system 106 within the system 100, the 5G system 106 is a wireless communication system used to carry TSN traffic between various TSN end devices, e.g., the I/O devices 102 and the controller 104. In some implementations, the 5G system 106 is configured to emulate as one TSN bridge per User Plane Function (UPF) (similar to TSN bridges 108, according to the TSN standards discussed above). The 5G system 106 may be a New Radio (NR) network implemented in accordance with 3GPP 23 and 38 series specifications (which are incorporated herein in their entirety), and integrated into the system 100 in accordance with the 3GPP Release 17 23.501 standard v17.1.1 and v17.2.0 (which are incorporated herein in entirety). As shown, the 5G system 106 may include, in the 5G user plane, User Equipment (UE) 118, gNodeB (gNB) 120, User Plane Function (UPF) 122, the 5G transport network link 140 between the RAN 120 and the UPF 122, and in the 5G control plane, application function (AF) 124 and session management function (SMF) and policy control function (PCF) 126, among other components. In some implementations, the 5G system 106 may be configured to provide an ultra-reliable low latency communication (URLLC) service. The 5G system 106 based on the New Radio (NR) interface includes several functionalities to achieve low latency for selected data flows. NR enables shorter slots in a radio subframe, which benefits low-latency applications. NR also introduces mini-slots, where prioritized transmissions can be started without waiting for slot boundaries, further reducing latency. As part of giving priority and faster radio access to URLLC traffic, NR introduces preemption—where URLLC data transmission can preempt ongoing non-URLLC trans- missions. Additionally, NR applies very fast processing, enabling retransmissions even within short latency bounds.

In some implementations, 5G defines extra-robust trans- mission modes for increased reliability for both data and control radio channels. Reliability is further improved by various techniques, such as multi-antenna transmission based on multiple-input and multiple-output (MIMO) tech- niques, the use of multiple carriers and packet duplication over independent radio links.

Time synchronization is embedded into the 5G cellular radio systems as an essential part of their operation, which has already been common practice for earlier cellular net- work generations. The radio network components them- selves are also time synchronized, for instance, through the precision time protocol telecom profile, e.g., based on a 5G internal system clock 190. This provides a good basis to provide synchronization for time-critical applications. For URLLC service, the 5G system 106 uses time synchroniza- tion for its own operations, as well as the multiple antennas and radio channels that provide reliability. Besides the 5G RAN features, the 5G system 106 may also provide solu- tions in the core network (CN) for Ethernet networking and URLLC. The 5G CN supports native Ethernet protocol data unit (PDU) sessions. 5G assists the establishment of redun- dant user plane paths through the 5GS, including RAN, the CN and the transport network. The 5GS also allows for a redundant user plane separately between the RAN and CN nodes, as well as between the UE and the RAN nodes.

As noted above, in the integrated system 100, the 5G system 106 includes one TSN (virtual) bridge per UPF. The 5G system 106 includes TSN Translator (TT) functionality for the adaptation of the 5G system 106 to the TSN domain, both for the user plane and the control plane, hiding the 5G system 106's internal procedures from the TSN bridged network. The 5G system 106 provides TSN bridge ingress and egress port operations through the TT functionality. For instance, the TTs support hold and forward functionality for de-jittering. FIG. 1 illustrates the case when the 5G system 106 connects an end station 102 to a bridged network 108; however, the 5G system 106 may also interconnect bridges 108.

For the 5G system 106 to be integrated into the TSN system 100, requirements of a TSN stream can be fulfilled only when resource management allocates the network resources for each hop along the whole path. In line with TSN configuration (802.1Qcc), this is achieved through interactions between the 5G system 106 and the CNC 112. The interface between the 5G system 106 and the CNC allows for the CNC 112 to learn the characteristics of the 5G virtual bridge, and for the 5G system 106 to establish connections with specific parameters based on the informa- tion received from the CNC 112. Bounded latency requires deterministic delay from 5G as well as QoS alignment between the TSN and 5G domains. For instance, if a 5G virtual bridge acts as a TSN bridge, then the 5G system 106 emulates time-controlled packet transmission in line with Scheduled Traffic (802.1Qbv). For the 5G control plane, the TT in the AF 124 receives the transmission time information of the TSN traffic classes from the CNC 112. In some implementations, the mapping of the TSN scheduling prob- lem to QUBO described above is implemented within the CNC 112, per the TSN standards (e.g., as defined in IEEE 802.1Qcc). In the 5G user plane, the TT at the UE 118 and the TT at the UPF 122 may regulate the time-based packet transmission accordingly. The different TSN traffic classes may be mapped to different 5G QOS Indicators (5QIs) in the AF 124 and the PCF 126 as part of the QoS alignment between the TSN and 5G domains, and the different 5QIs are treated according to their QoS requirements.

With respect to time synchronization, the 5G system 106 may implement the gPTP of the connected TSN network. The 5G system 106 may act as a virtual gPTP time-aware system and support the forwarding of gPTP time synchro- nization information between end stations 102 and bridges 108 through the 5G user plane TTs.

Figure 2:
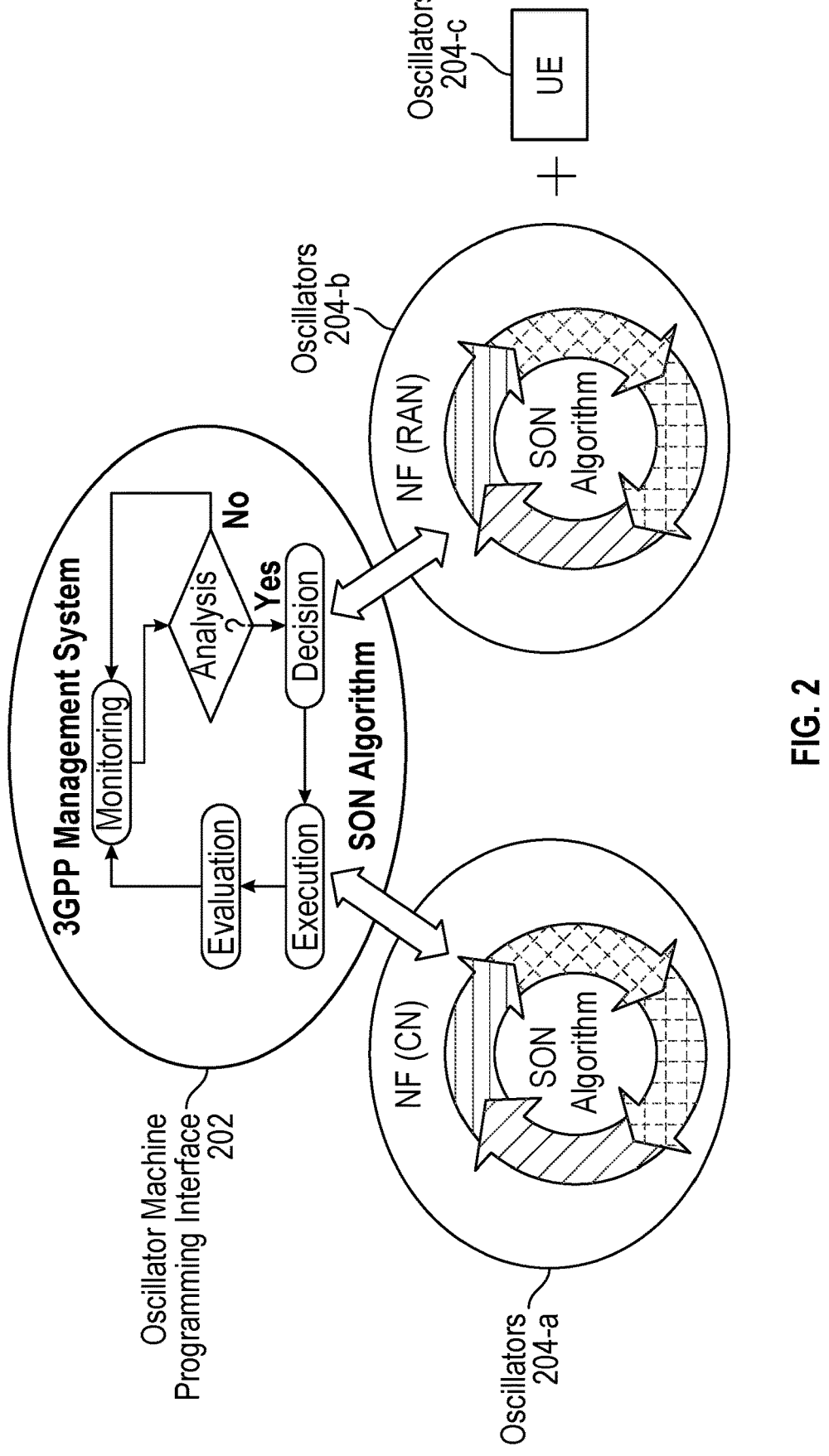
FIG. 2 illustrates distribution of a network of oscillators for solving a network configuration problem in a self-organizing network environment as specified by 3GPP (e.g., a TSN scheduling problem, a MIMO detection problem, an SVN problem, etc.).

FIG. 2 illustrates distribution of a network of oscillators for solving a network configuration problem in a self- organizing network environment as specified by 3GPP (e.g., a TSN scheduling problem, a MIMO detection problem, an SVN problem, etc.). In some embodiments, a 3GPP man- agement system serves as an oscillator machine program- ming interface 202. The oscillator machine is sometimes colloquially referred to as an Ising machine, even though the embodiments of the present disclosure are not restricted to Ising models (e.g., some embodiments use a QUBO approach). The oscillator machine programming interface 202 orchestrates a self-organizing network (SON) algo- rithm, which includes distributing portions of the network configuration problem to spatially distributed sets of oscil- lators (e.g., pulse-coupled oscillators), which together com- prise the network of oscillators. For example, in some embodiments, the core network (CN) includes a first plu- rality of oscillators 204-a, the radio access network (RAN) includes a second plurality of oscillators 204-b, and each user equipment device includes a respective third plurality of oscillators 204-c. Each of the aforementioned pluralities of oscillators executes its own portion of the SON algorithm, which comprises configuring the plurality of oscillators into an initial configuration representing the network configura- tion problem and reading out a final (e.g., annealed) state of the oscillators. The readout is provided back to the oscillator machine programming interface 202, which converts the readout into a solution to the network configuration prob- lem.

Figure 3:
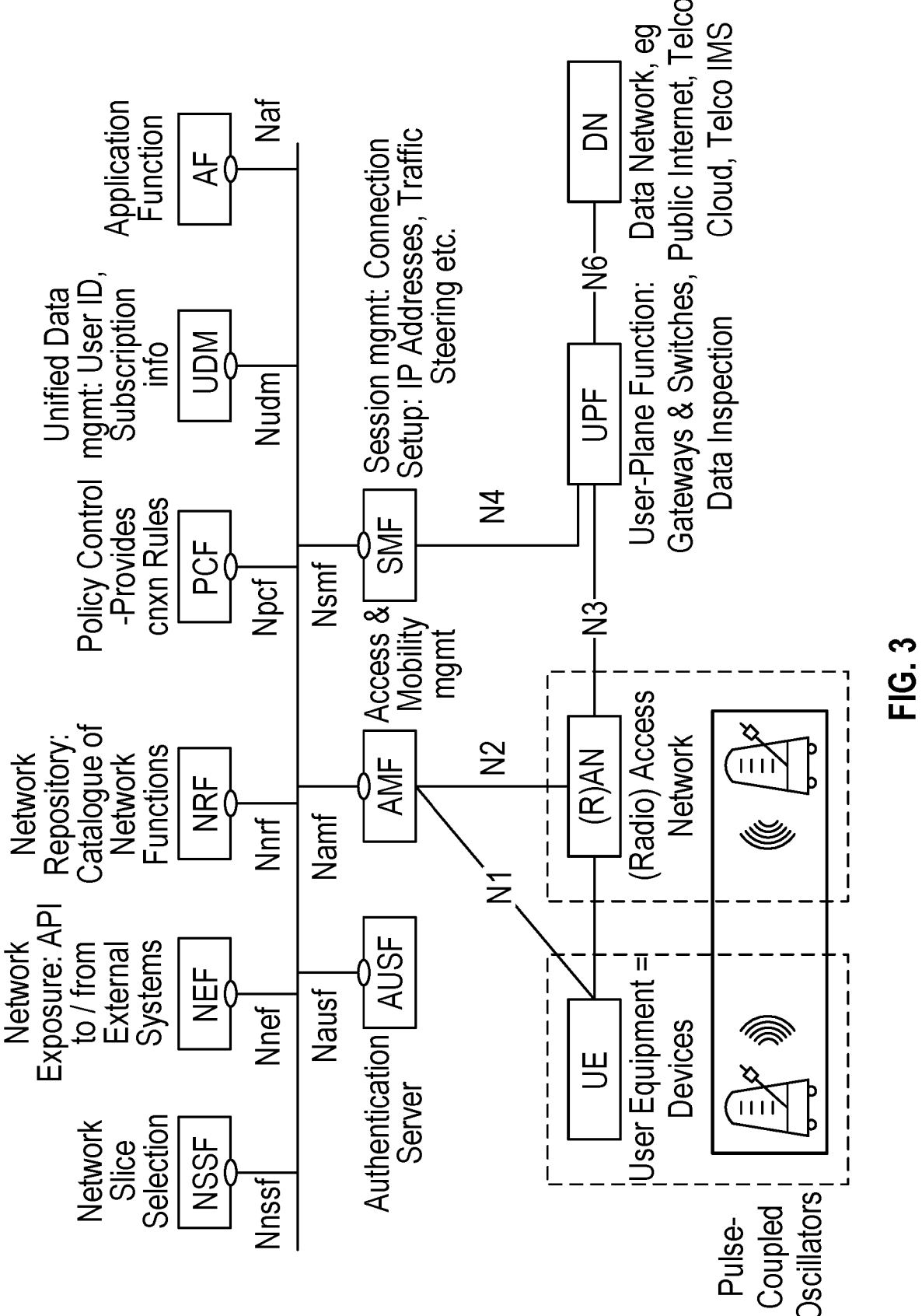
FIG. 3 illustrates distribution of a network of oscillators for solving a network configuration problem in a 5G system (5GS), in accordance with some embodiments.
Figure 4:
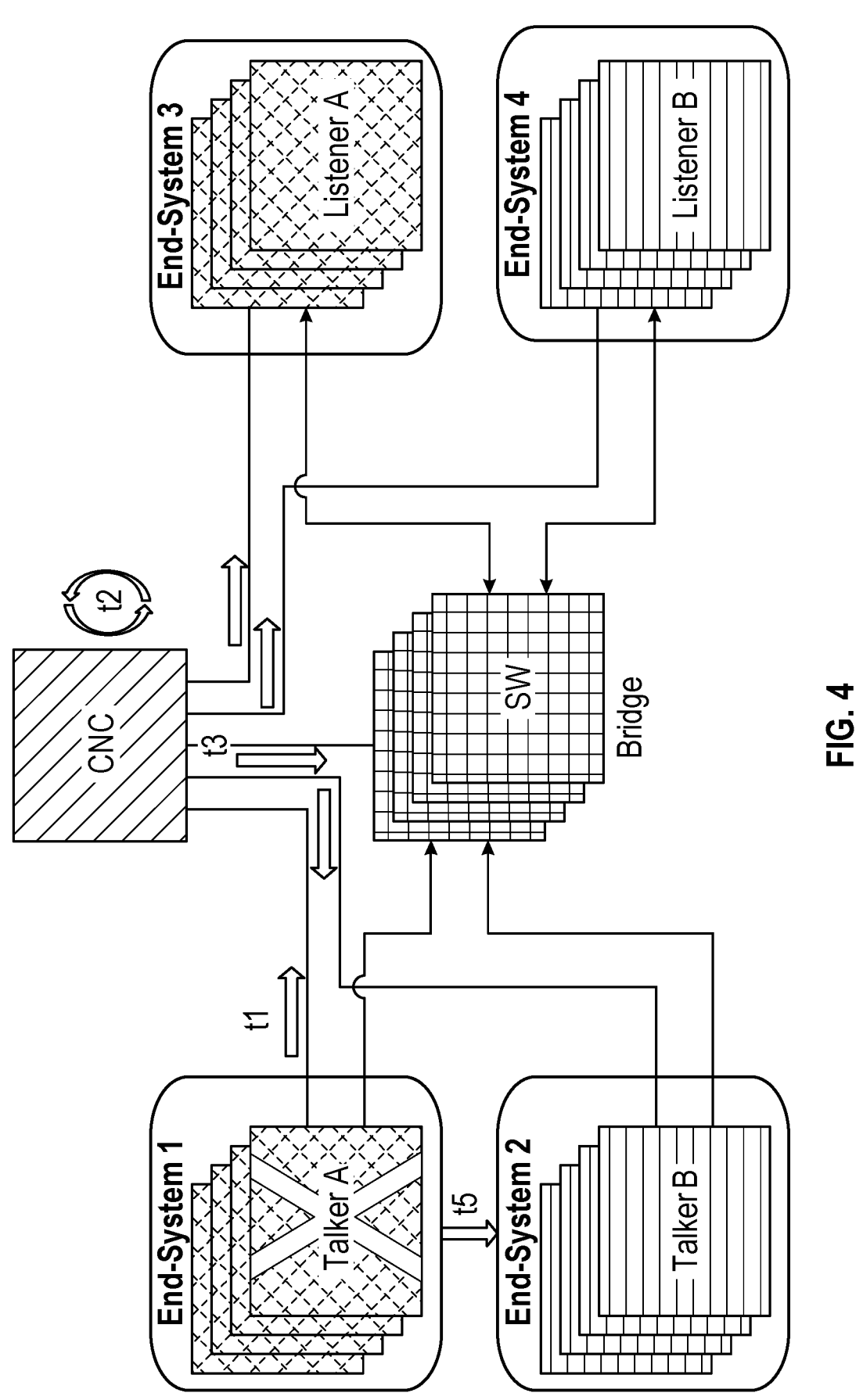
FIG. 4 illustrates a schematic diagram of rapid rescheduling in a TSN network using a network of oscillators, in accordance with some embodiments.

FIG. 3 illustrates distribution of a network of oscillators for solving a network configuration problem in a 5G system (5GS), in accordance with some embodiments. FIG. 3 is similar to FIG. 2 in that FIG. 3 illustrates that pulse-coupled oscillators (implemented in hardware and/or software) may be distributed across any or all 5G equipment including UE RAN, all elements of a 5G radio split, MEC, and 5G Core. In some embodiments, the oscillators include local oscilla- tors that are included in UE in the 5G standard. These are configured and controlled via 5G Management Orchestra- tion and Automation (MANO). Thus, in some embodiments, a 5G network (or other network) serving as a time sensitive network (or other deterministic network) operates as an Ising machine (e.g., a pulse-coupled oscillator (PCO) Ising machine) capable of rescheduling itself (e.g., self-healing) using a self-organizing network (SON) algorithm. 5G sys- tems typically expose access to configuration via standard protocols and data models such as, but not limited to, NETCONF/YANG, SNMP/MIB, JSON, XML, REST- CONF, and RESTful microservices with RESTful APIs. In some embodiments (e.g., for so called "fixed" PCO Ising machine programs), the configuration information from these protocols, data models, and APIs feed data into the PCO Ising machine which returns the results via the same protocol, data models, and APIs. A fixed Ising machine program is a program whose code is installed by the vendor or infrastructure provider and does not change. In some embodiments, PCO Ising machine programs may be loaded via the same or similar protocol, data models, and APIs. In other words, one can perform remote procedure calls to PCO Ising machine programs, or upload and run PCO Ising machine code specified within the aforementioned protocol, data models, and APIs. PCO Ising machine programs may also be written and installed as MEC applications by 5G users. Finally, one could transmit both PCO Ising machine programs (e.g., in QUBO or conjunctive normal form) along with the associated input data to be processed in the MEC. In other words, 5G messages can carry both code and data in the form of an active message that is processed in the network as the message traverses the network. In various embodiments, any or all 5G network functions may be implemented as PCO Ising machine programs. FIG. 4 illustrates a schematic diagram of rapid rescheduling in a TSN network using a network of oscillators, in accordance with some embodiments. In this example, a talker A suffers a permanent fault, thus requiring the TSN network to reconfigure itself. In some embodiments, the TSN network reconfigures itself in real-time, meaning that the TSN network reconfigures itself in sufficient time to ensure that no messages are delayed in arriving at the listeners. Note here that the time fc to reconfigure the network is the sum of: (1) the time $t_1$ for the CNC to detect that talker A has failed, (2) the time $t_2$ needed for the CNC to recompute a schedule without talker A, and (3), the time $t_3$ for the CNC to reconfigure the devices (e.g., bridges and end devices). To meet the requirement above, the time $t_c$ must be faster than the time requirements $t_5$ for talker B to handle talker A and talker B's communications. In some circumstances, these requirements are achievable using the oscillator based approaches described herein.

Figure 5:
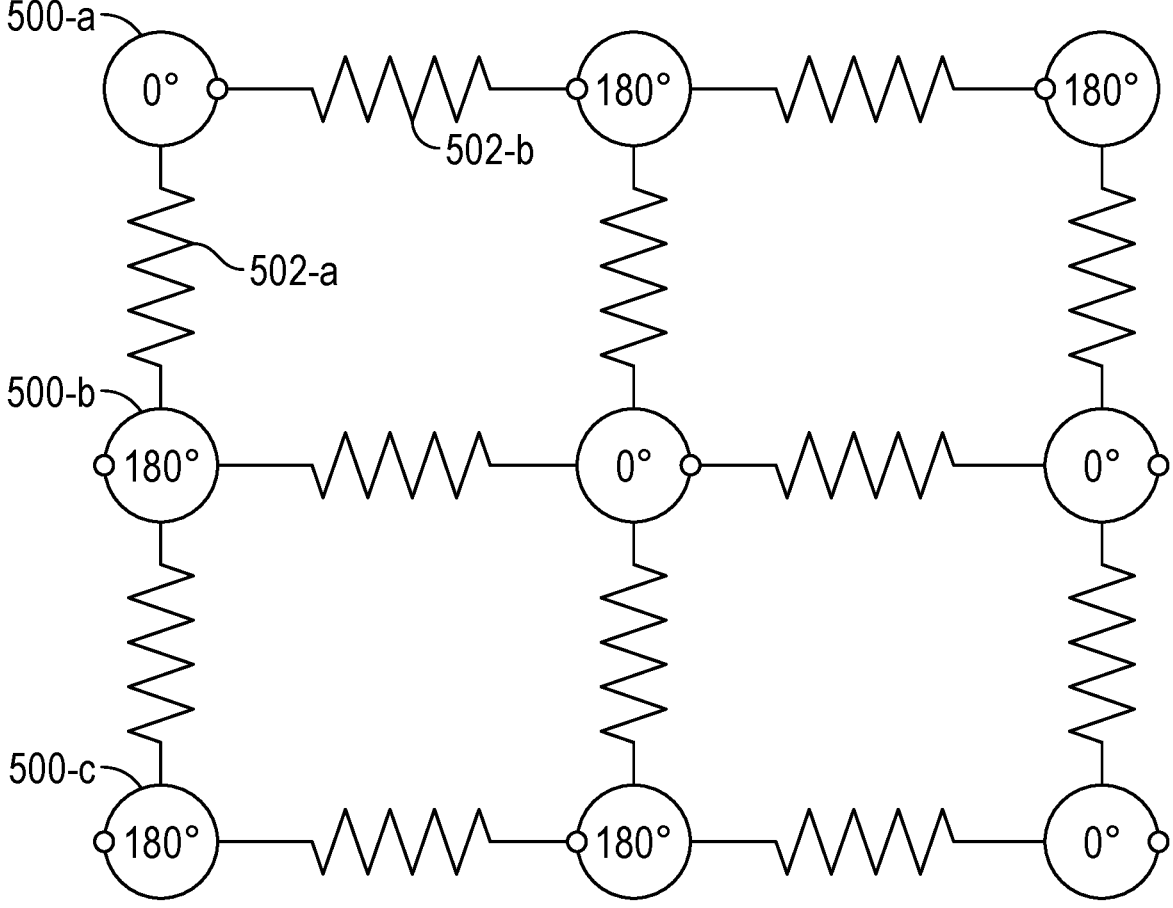
FIG. 5 illustrates a network of oscillators, in accordance with some embodiments.

FIG. 5 illustrates a network of oscillators 500 (e.g., of which oscillator 500-$a$; 500-$b$; and 500-$c$ are representative), in accordance with some embodiments. In various embodiments, the oscillators may comprise micro-electro-mechanical system (MEMS), micro-opto-electro-mechanical (MO-EMS) oscillators, nano-oscillators, electronic oscillators (e.g., RC circuits) and/or crystal oscillators. As described above, in some embodiments, the oscillators are spatially distributed across different devices (e.g., different UE devices, core network devices, radio access network devices, etc.). Thus, in some embodiments, FIG. 5 illustrates a subset of the network of oscillators that are present on a particular machine. As an Ising machine, the oscillators are typically coupled (e.g., via couplings 502, of which couplings 502-$a$ and 500-$b$ are representative) to a small number of neighboring oscillators (e.g., each nearest neighbor and only each nearest neighbor). The coupling strengths are configured according to an oscillator representation of the network configuration problem. The type of coupling (e.g., optical, electrical, magnetic) depends on the type of oscillator and can be configured with appropriate supporting circuitry. A final configuration (e.g., state) of the oscillators (e.g., after an annealing period) represents a solution, or partial solution, to the oscillator representation of the problem. For example, in FIG. 5, the configuration includes a phase of the oscillators (e.g., oscillator 500-$a$ has a phase of 0 degrees, while oscillator 500-$b$ and oscillator 500-$c$ have a phase of 180 degrees). These states (e.g., phases) are converted back to a solution to the network configuration problem (e.g., TSN scheduling problem).

Note that, since in some embodiments, the oscillator representation of the network configuration problem is distributed across different devices, in such embodiments, there is also indirect coupling between sets of oscillators on different devices. Such coupling may be achieved using an RF (e.g., analog) signal (e.g., at a carrier frequency of wireless communication within the network), through modulation of the RF signal (e.g., phase-shift keying), and/or through a digital signal.

FIGS. 6A-6B are flow diagrams illustrating a method 600 of solving a network configuration request, in accordance with some embodiments. Some operations of method 600 may be performed at a central network configurator (CNC). Some operations, as described below, may be distributed across other components of the network. For ease of explanation, method 600 is described below as being performed by a CNC.

The CNC obtains (602) a configuration request for a communications network. In some embodiments, the configuration request for the communications network is (604) a scheduling request for a time-sensitive network (TSN) (or a scheduling request for any other deterministic network). In some embodiments, the scheduling request for the time-sensitive network is a rescheduling request (e.g., a rapid rescheduling request). In some embodiments, the rescheduling request is received in response to failure of a device within the network (e.g., a talker or listener). In some embodiments, the rescheduling request is automatically generated by the network in response to failure of a device within the network. In some embodiments, the TSN is (606) a self-organizing network (SON) (e.g., scheduling within the TSN is implemented in a self-organizing manner).

In some embodiments, rather than a TSN scheduling request, the configuration request for the communications network is a MIMO detection request or an SVD request (or any other optimization problem described herein).

In some embodiments, the communications network is (608) a 5G network (e.g., a TSN-5G network).

In some embodiments, the CNC represents the network configuration request as a problem to be solved by an oscillator machine (or more colloquially, an Ising machine). In some embodiments, the oscillators are implemented on devices within the 5G network (e.g., CN or RAN components, UE devices, etc.). Thus, in some embodiments, the 5G network includes the oscillator machine that determines the TSN schedule (or other network configuration solution), and is thus self-organizing. To that end, the CNC configures (610) a network of oscillators into an initial configuration representing the configuration request for the communications network. In some embodiments, configuring the network of oscillators comprises setting an initial phase of individual oscillators in the network of oscillators, as well as configuring couplings between respective oscillators. In some embodiments, configuring the network of the oscillators into the initial configuration representing the configuration request for the communications network comprises representing (612) the configuration request as a quadratic unconstrained binary optimization (QUBO) task (e.g., each oscillator represents a binary value x, as described in the section entitled "Conversion of TSN Scheduling Problems into a QUBO formulation" above). In some embodiments, rather than a QUBO task (also referred to as a QUBO problem), the configuration request is represented as an Ising model or a MAXCUT problem.

In some embodiments, when the network configuration request is a TSN scheduling request, the request includes requested TSN flows (e.g., which talkers have to communicate with which listeners), the latency requirements for communications that will be sent by the TSN flows, the maximum size of the communications that will be sent by the TSN flows, and any other requirements (e.g., whether there is a sequence order to the requested TSN flows).

In some embodiments, the oscillators (614) are pulse-coupled oscillators. In some embodiments, the plurality of oscillators comprise oscillators selected from the group consisting of micro-electro-mechanical system (MEMS) oscillators (including MOEMS), nano-oscillators, electronic oscillators, and crystal oscillators.

In some embodiments, the oscillators are distributed (616) across a plurality of user equipment (UE) devices and information to configure the network of oscillators is sent over the communications network.

The CNC reads out (618) a final configuration of the network of oscillators, the final configuration representing a solution to the configuration request for the communications network. In some embodiments, reading out the final configuration of the network of oscillators includes determining a phase for each of the oscillators. In some embodiments, the oscillators are distributed across different devices, which read out the final configuration of their respective oscillators, and the CNC receives the read out from each of the distributed devices. In some embodiments, the CNC converts the final configuration of the network of oscillators to a TSN schedule (e.g., a solution to all the TSN gate open times for all the switches in the network that enables all the TSN flows to co-exist without overlapping in space or time). Note that there may be multiple solutions to the configuration request, depending on its nature, but typically finding one solution is sufficient.

In some embodiments, the operations of configuring the network of oscillators and reading out a final configuration of the network of oscillators are performed (620) in under a second.

In some embodiments, the operations of configuring the network of oscillators and reading out a final configuration of the network of oscillators are performed (622) in under an amount of time required for data communications.

The CNC provides (624) information over the communications network according to the configuration request (e.g., the CNC distributes the solution to the network configuration problem to the necessary devices within the network, which may include some of the devices whose oscillators were used in determining the solution).

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 8:
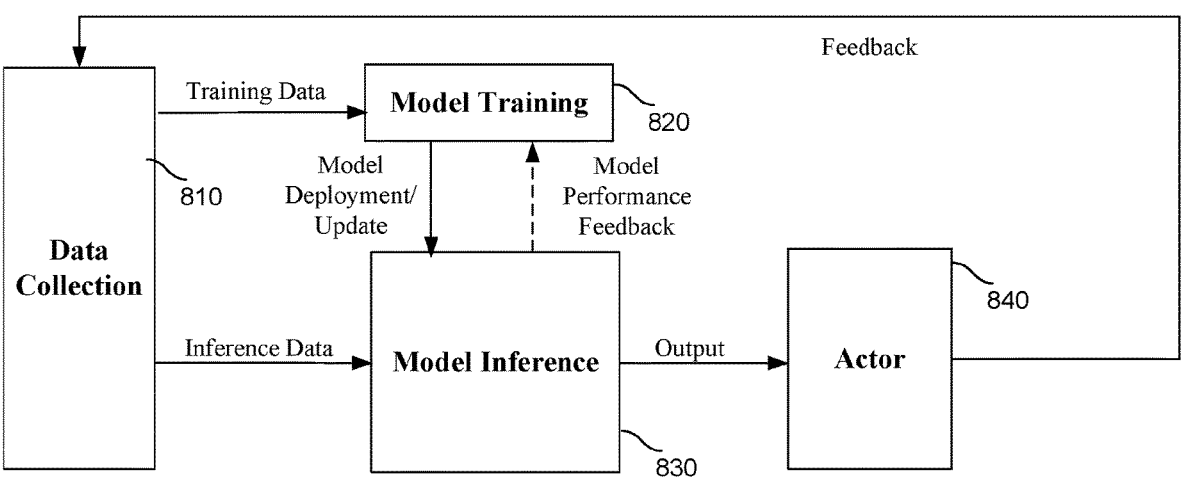
FIG. 8 illustrates a general functional framework to implement network configuration techniques using AI/ML, in accordance with some embodiments.

In some implementations, the network configuration techniques provided in this disclosure are implemented using artificial intelligence (AI)/machine learning (ML) techniques, e.g., in accordance with 3GPP TR 37.817 V17.0.0 (2022-04) (which is incorporated herein by reference in its entirety). FIG. 8 illustrates a general functional framework 800 to implement using AI/ML the network configuration techniques provided in this disclosure. Data Collection 810 is a function that provides input data to Model training 820 and Model inference 830 functions. AI/ML algorithm specific data preparation (e.g., data pre-processing and cleaning, formatting, and transformation) is not carried out in the Data Collection function 810. In the context of the present disclosure, the "model" in this framework includes pulse-coupled oscillator settings.

Examples of input data may include measurements from UEs or different network entities, feedback from Actor 840, output from an AI/ML model. Training Data may be data needed as input for the AI/ML Model Training function. Inference Data may be data needed as input for the AI/ML Model Inference function.

Model Training 820 is a function that performs the AI/ML model training, validation, and testing which may generate model performance metrics as part of the model testing procedure. The Model Training function 820 is also responsible for data preparation (e.g., data pre-processing and cleaning, formatting, and transformation) based on Training Data delivered by a Data Collection function 810, if required. Model training 820 of pulse coupled oscillators (PCO) may be either on-line or off-line. AI/ML Inference data is consumed in the process of using the trained PCO to make a prediction or guide the decision based upon collected data and the AI/ML model.

Model Inference 830 is a function that provides AI/ML model inference output (e.g., predictions or decisions). Model Inference function may provide Model Performance Feedback to Model Training function 820 when applicable. The Model Inference function 830 is also responsible for data preparation (e.g., data pre-processing and cleaning, formatting, and transformation) based on Inference Data delivered by a Data Collection function 810, if required. The inference output of the AI/ML model produced by a Model Inference function 830. Model Performance Feedback may be used for monitoring the performance of the AI/ML model, when available.

The Actor 840 is a function that receives the output from the Model Inference function 830 and triggers or performs corresponding actions. The Actor 840 may trigger actions directed to other entities or to itself. In the context of the present disclosure, the Actor 840 is the TSN scheduler and the MIMO detection system. The feedback may include information that may be needed to derive training data, inference data or to monitor the performance of the AI/ML Model and its impact to the network through updating of KPIs and performance counters.

Figure 7:
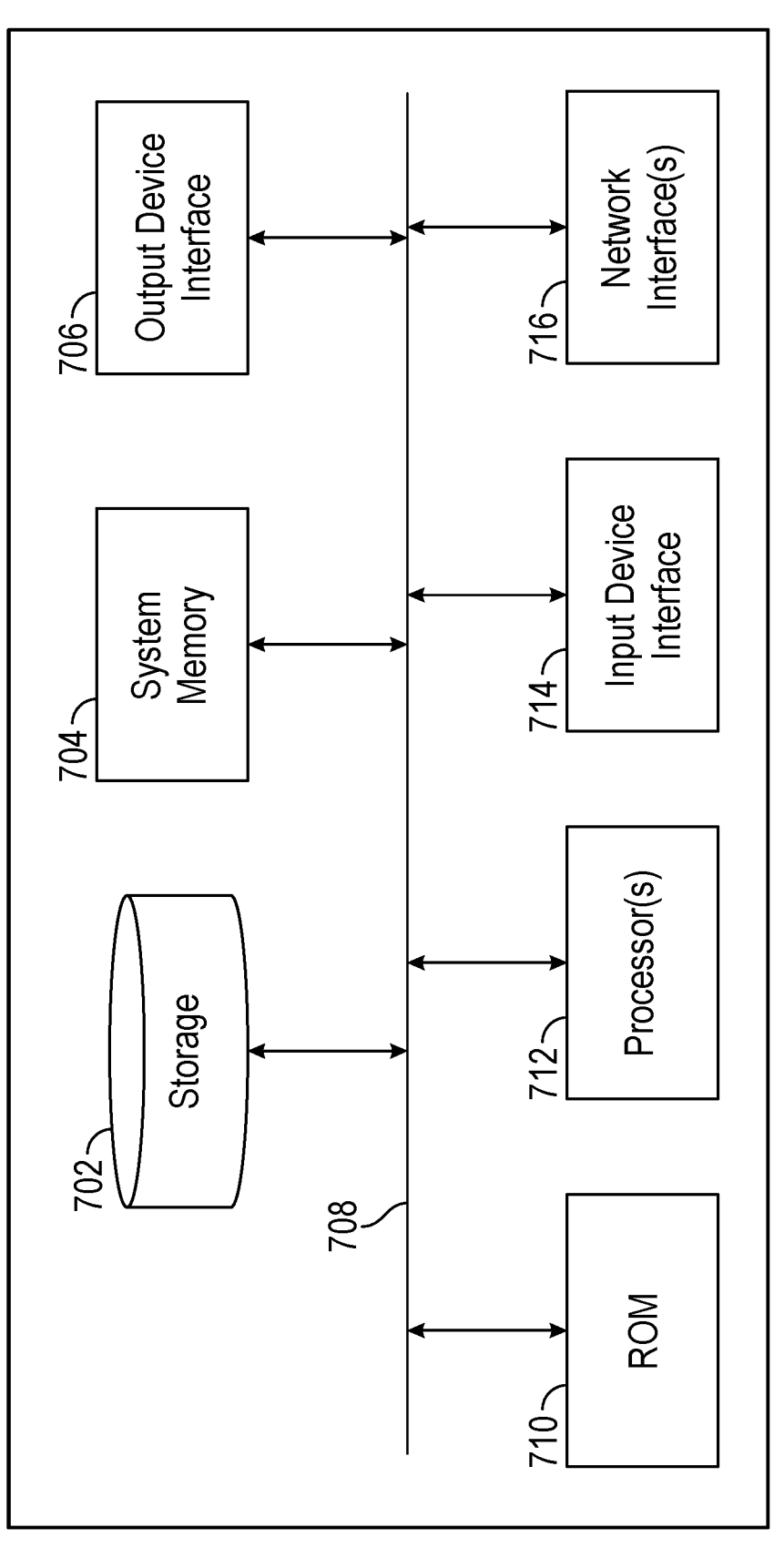
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of the TSN network (e.g., a CNC). The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710 (which are each implemented as a non-transitory computer-readable medium). From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet). Any or all components of the electronic system 700 can be used in conjunction with the subject disclosure.

In accordance with aspects of the disclosure, a method for network configuration (e.g., for a 5G network) is provided. The method may include obtaining a configuration request for a communications network; configuring a network of models (e.g., oscillators or oscillators' settings) into an initial configuration representing the configuration request for the communications network; reading out a final configuration of the network of models, the final configuration representing a solution to the configuration request for the communications network; and providing information over the communications network according to the configuration request. In some implementations, the network of models includes a network of oscillators (e.g., pulse-coupled oscillators) and configuring the network of the oscillators into the initial configuration representing the configuration request for the communications network comprises representing the configuration request as a quantum program task (e.g., a QUBO task). The network of oscillators may include oscillators selected from the group consisting of: micro-electro-mechanical system (MEMS) oscillators, nano-oscillators, electronic oscillators, crystal oscillators, and transmon.

The operations of configuring the network of models and reading out a final configuration of the network of models may be performed in under an amount of time required for data communications. In some implementations, the configuration request for the communications network is a scheduling request for a deterministic network, e.g., a self-organizing network (SON). In some implementations, the configuration request is a TSN scheduling request for a component of a 5G network.

In accordance with aspects of the disclosure, a system for network configuration (e.g., for a 5G network) is provided. The system includes one or more processors and memory. The memory stores instructions for execution by the one or more processors, including instructions for: obtaining a configuration request for a communications network; configuring a network of models (e.g., oscillators or oscillators' settings) into an initial configuration representing the configuration request for the communications network; reading out a final configuration of the network of models, the final configuration representing a solution to the configuration request for the communications network; and providing information over the communications network according to the configuration request.

In some implementations, the network of models includes a network of oscillators (e.g., pulse-coupled oscillators) and configuring the network of the oscillators into the initial configuration representing the configuration request for the communications network comprises representing the configuration request as a quantum program task (e.g., a QUBO task). The network of oscillators may include oscillators selected from the group consisting of: micro-electro-mechanical system (MEMS) oscillators, nano-oscillators, electronic oscillators, crystal oscillators, and transmon.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks. The functions disclosed herein may be implemented using quantum computing, pulse-coupled oscillation (PCO)/Ising computing.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The invention claimed is:

1. A method, comprising:
obtaining a configuration request for a communications network;
configuring a network of models into an initial configuration representing the configuration request for the communications network as a quantum program task, the network of models including a network of oscillators;
reading out a final configuration of the network of models, the final configuration representing a solution to the configuration request for the communications network; and
providing information over the communications network according to the configuration request.

2. The method of claim 1, wherein the quantum program task includes a quadratic unconstrained binary optimization (QUBO) task.

3. The method of claim 1, wherein configuring the network of models and reading out a final configuration of the network of models are performed in under an amount of time required for data communications.

4. The method of claim 1, wherein the configuration request for the communications network is a scheduling request for a deterministic network.

5. The method of claim 4, wherein the deterministic network is a self-organizing network (SON).

6. The method of claim 1, wherein the configuration request is a time-sensitive network (TSN) scheduling request for a component of a 5G network.

7. The method of claim 1, wherein the oscillators are pulse-coupled oscillators.

8. The method of claim 1, wherein the oscillators are distributed across a 5G network and information to configure the network of models is sent over the 5G network.

9. The method of claim 1, wherein the communications network is a 5G network.

10. The method of claim 1, wherein the network of oscillators comprise oscillators selected from the group consisting of: micro-electro-mechanical system (MEMS) oscillators, nano-oscillators, electronic oscillators, crystal oscillators, and transmon.

11. A device, comprising:
one or more processors; and
a memory storing instructions for execution by the one or more processors, including instructions for:
obtaining a configuration request for a communications network;
configuring a network of models into an initial configuration representing the configuration request for the communications network as a quantum program task, the network of models including a network of oscillators;
reading out a final configuration of the network of models, the final configuration representing a solution to the configuration request for the communications network; and
providing information over the communications network according to the configuration request.

12. The device of claim 11, wherein the quantum program task includes a quadratic unconstrained binary optimization (QUBO) task.

13. The device of claim 11, wherein configuring the network of models and reading out a final configuration of the network of models are performed in under an amount of time required for data communications.

14. The device of claim 11, wherein the oscillators are pulse-coupled oscillators.

15. The device of claim 11, wherein the oscillators are distributed across a 5G network and information to configure the network of models is sent over the 5G network.

16. The device of claim 11, wherein the network of oscillators comprise oscillators selected from the group consisting of: micro-electro-mechanical system (MEMS) oscillators, nano-oscillators, electronic oscillators, crystal oscillators, and transmon.

17. A device, comprising:
a set of pulse-coupled oscillators;
a processor; and
a memory storing instructions for execution by the processor, including instructions for:
obtaining a configuration information for a communications network from an external controller to configure the set of pulse-coupled oscillators as part of a network of models, wherein the configuration information represents a solution to a configuration request for the communications network based on maximum-likelihood estimation (MLE)-MIMO detection; and
configuring the set of pulse-coupled oscillators based on the configuration information from the external controller.

18. The device of claim 17, wherein the configuration information for the communications network is represented as a quantum program task, the quantum program task including a quadratic unconstrained binary optimization (QUBO) task.

19. The device of claim 17, wherein operations of configuring the network of models and reading out a final configuration of the network of models are performed in under an amount of time required for data communications.

20. The device of claim 17, wherein the set of pulse-coupled oscillators is configured to execute a self-organizing network (SON) algorithm to configure the set of pulse-coupled oscillator into an initial configuration representing a network configuration problem, read out a final state of the set of pulse-coupled oscillator, the configuration information is generated based on the final state.

* * * * *